United States Patent
Kawaguchi

(10) Patent No.: US 9,235,430 B2
(45) Date of Patent: Jan. 12, 2016

(54) INFORMATION PROCESSING APPARATUS, INFORMATION PROCESSING METHOD, PROGRAM AND INFORMATION PROCESSING SYSTEM

(75) Inventor: Kimitaka Kawaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 12/489,847

(22) Filed: Jun. 23, 2009

(65) Prior Publication Data

US 2010/0031194 A1    Feb. 4, 2010

(30) Foreign Application Priority Data

Jul. 29, 2008    (JP) .................................. 2008-195227

(51) Int. Cl.
  *G06F 3/048*  (2013.01)
  *G06F 9/445*  (2006.01)
  *G06F 9/44*   (2006.01)

(52) U.S. Cl.
  CPC .............. *G06F 9/445* (2013.01); *G06F 9/4446* (2013.01)

(58) Field of Classification Search
  CPC ... G06F 3/0482; G06F 3/0481; G06F 9/4443; G06F 3/04817; G06F 9/4446; H04N 5/44543; H04M 1/72583; H04M 1/72586; H04L 29/08072; H04L 29/06; H04L 29/0809; H04L 29/08981; G06Q 30/02
  USPC ................... 715/810, 811; 709/217
  See application file for complete search history.

(56) References Cited

U.S. PATENT DOCUMENTS

| | | | | |
|---|---|---|---|---|
| 5,564,004 A * | 10/1996 | Grossman | ............. | G06F 3/0481 715/811 |
| 5,684,970 A * | 11/1997 | Asuma et al. | ................. | 715/775 |
| 5,745,715 A * | 4/1998 | Pickover | ............... | G06F 3/0481 715/811 |
| 5,852,440 A * | 12/1998 | Grossman | ............. | G06F 3/0481 715/811 |
| 5,991,735 A * | 11/1999 | Gerace | ......................... | 705/7.33 |
| 6,128,016 A * | 10/2000 | Coelho et al. | ................. | 715/808 |
| 6,332,024 B1 * | 12/2001 | Inoue | .................... | G06F 3/0236 379/433.04 |
| 6,567,104 B1 * | 5/2003 | Andrew et al. | ............... | 715/762 |

(Continued)

FOREIGN PATENT DOCUMENTS

| | | |
|---|---|---|
| JP | 11-149485 | 6/1999 |
| JP | 2003-50719 | 2/2003 |

(Continued)

OTHER PUBLICATIONS

Apple User Guide (http://passionemobile.files.wordpress.com/2007/11/iphone_user_guide.pdf; accessed on Mar. 15, 2014).*

(Continued)

*Primary Examiner* — Jessica Chuang
(74) *Attorney, Agent, or Firm* — Oblon, McClelland, Maier & Neustadt, L.L.P.

(57) ABSTRACT

An information processing apparatus is provided which includes a storage unit to store reference parameter information made up of a plurality of pieces of parameter information and associated with each program, an acquisition unit to acquire the plurality of pieces of parameter information of current time, a specifying unit to specify a program associated with a reference parameter similar to the plurality of pieces of parameter information of current time, and a display control unit to create a startup menu screen containing a startup display of a program according to a specified result by the specifying unit.

14 Claims, 13 Drawing Sheets

(56) References Cited

U.S. PATENT DOCUMENTS

| | | | |
|---|---|---|---|
| 6,633,315 B1* | 10/2003 | Sobeski et al. | 715/762 |
| 6,668,177 B2* | 12/2003 | Salmimaa | G06F 3/04817 455/456.3 |
| 6,760,046 B2* | 7/2004 | I'Anson | G06F 17/3087 707/E17.11 |
| 6,996,777 B2* | 2/2006 | Hiipakka | 715/727 |
| 7,386,279 B2* | 6/2008 | Wagner | G06F 3/04817 455/556.2 |
| 7,548,902 B2* | 6/2009 | Bidet et al. | |
| 7,693,512 B1* | 4/2010 | West | H04M 3/42263 455/417 |
| 7,861,184 B2* | 12/2010 | Kim | G06F 3/0482 715/811 |
| 7,937,434 B2* | 5/2011 | Cho | 709/203 |
| 8,209,631 B2* | 6/2012 | Kraft | G06F 3/0338 715/811 |
| 8,255,382 B2* | 8/2012 | Carpenter et al. | 707/707 |
| 8,271,889 B1* | 9/2012 | Beckert et al. | 715/762 |
| 8,275,382 B2* | 9/2012 | Lewis | 455/451 |
| 8,290,513 B2* | 10/2012 | Forstall et al. | 455/456.3 |
| 8,295,542 B2* | 10/2012 | Albertson et al. | 382/103 |
| 8,311,526 B2* | 11/2012 | Forstall et al. | 455/414.3 |
| 8,315,610 B2* | 11/2012 | Hasemann | 455/414.2 |
| 8,320,932 B2* | 11/2012 | Pinder et al. | 455/456.1 |
| 8,321,806 B2* | 11/2012 | Agrusa et al. | 715/772 |
| 8,326,315 B2* | 12/2012 | Phillips et al. | 455/456.1 |
| 8,380,190 B2* | 2/2013 | Boss et al. | 455/433 |
| 8,402,148 B2* | 3/2013 | Horvitz | 709/228 |
| 8,453,065 B2* | 5/2013 | Chaudhrl et al. | 715/762 |
| 8,843,853 B1* | 9/2014 | Smoak | G06F 3/0482 715/788 |
| 8,942,995 B1* | 1/2015 | Kerr | G01C 21/00 463/25 |
| 8,972,878 B2* | 3/2015 | Mohler | G06F 3/04817 715/708 |
| 2002/0054174 A1* | 5/2002 | Abbott et al. | 345/863 |
| 2002/0160817 A1* | 10/2002 | Salmimaa | G06F 3/04817 455/566 |
| 2003/0098892 A1* | 5/2003 | Hiipakka | 345/846 |
| 2003/0158855 A1* | 8/2003 | Farnham et al. | 707/102 |
| 2004/0259598 A1* | 12/2004 | Wagner et al. | 455/566 |
| 2005/0086330 A1* | 4/2005 | Perham et al. | 709/220 |
| 2005/0091111 A1* | 4/2005 | Green et al. | 705/14 |
| 2005/0097563 A1* | 5/2005 | Bidet et al. | 719/310 |
| 2005/0136949 A1* | 6/2005 | Barnes, Jr. | G06Q 10/1053 455/461 |
| 2006/0010395 A1* | 1/2006 | Aaltonen | G06F 3/0482 715/779 |
| 2006/0020633 A1* | 1/2006 | Cho | 707/104.1 |
| 2007/0011334 A1* | 1/2007 | Higgins et al. | 709/227 |
| 2007/0016442 A1* | 1/2007 | Stroup | 705/2 |
| 2007/0067373 A1* | 3/2007 | Higgins et al. | 707/206 |
| 2007/0100834 A1* | 5/2007 | Landry et al. | 707/10 |
| 2007/0220089 A1* | 9/2007 | Aegerter | 709/203 |
| 2007/0239813 A1* | 10/2007 | Pinder et al. | 708/270 |
| 2007/0244633 A1* | 10/2007 | Phillips et al. | 701/207 |
| 2008/0040488 A1* | 2/2008 | Gupta | H04L 67/16 709/227 |
| 2008/0134030 A1* | 6/2008 | Kansal | G06F 3/0481 715/700 |
| 2008/0162037 A1* | 7/2008 | Hasan Mahmoud | G01C 21/30 701/532 |
| 2008/0172261 A1* | 7/2008 | Albertson et al. | 705/7 |
| 2008/0319952 A1* | 12/2008 | Carpenter et al. | 707/3 |
| 2009/0006194 A1* | 1/2009 | Sridharan | G06Q 30/02 705/14.62 |
| 2009/0007017 A1* | 1/2009 | Anzures | G06F 3/04883 715/835 |
| 2009/0125584 A1* | 5/2009 | Agrawala et al. | 709/203 |
| 2009/0307311 A1* | 12/2009 | Fusari | 709/203 |
| 2010/0217837 A1* | 8/2010 | Ansari et al. | 709/218 |
| 2011/0016193 A1* | 1/2011 | Reisman | 709/217 |
| 2011/0072492 A1* | 3/2011 | Mohler | G06F 3/04817 726/3 |
| 2011/0263275 A1* | 10/2011 | Kale | H04W 4/02 455/456.2 |
| 2011/0302417 A1* | 12/2011 | Whillock et al. | 713/168 |
| 2012/0054798 A1* | 3/2012 | Murakami | 725/42 |
| 2012/0110070 A1* | 5/2012 | Takakura et al. | 709/203 |
| 2012/0166548 A1* | 6/2012 | Gropper | 709/205 |
| 2012/0331001 A1* | 12/2012 | Foster et al. | 707/770 |
| 2013/0047087 A1* | 2/2013 | Yamahara et al. | 715/727 |

FOREIGN PATENT DOCUMENTS

| | | | |
|---|---|---|---|
| JP | 2003-163629 | 6/2003 | |
| JP | 2003-308148 | 10/2003 | |
| JP | 2003-345595 | 12/2003 | |
| JP | 2004-326498 | 11/2004 | |
| JP | 2005-92469 | 4/2005 | |
| JP | 2008-102860 | * 10/2006 | G06F 3/048 |
| JP | 2006-313486 | 11/2006 | |
| JP | 2007-219761 | 8/2007 | |
| JP | 2008-102860 | 5/2008 | |

OTHER PUBLICATIONS

Office Action issued Nov. 16, 2010, in Japan Patent Application No. 2008-195227.

* cited by examiner

FIG. 5

| APPLICATION A | | | APPLICATION B | | | ... |
|---|---|---|---|---|---|---|
| LATITUDE | LONGITUDE | TIME | LATITUDE | LONGITUDE | TIME | ... |
| 36.53 | 154.033 | 20:56 | 36.04 | 153.678 | 8:56 | |
| 36.52 | 154.043 | 19:52 | 36.18 | 153.896 | 7:39 | |
| 36.53 | 154.036 | 22:31 | 36.04 | 153.676 | 8:2 | |
| ... | ... | ... | ... | ... | ... | |

INFORMATION PROCESSING APPARATUS, INFORMATION PROCESSING METHOD, PROGRAM AND INFORMATION PROCESSING SYSTEM

BACKGROUND OF THE INVENTION

1. Field of the Invention

The present invention relates to an information processing apparatus, an information processing method, a program and an information processing system.

2. Description of the Related Art

There is a trend to install various kinds of applications (programs) in an information processing apparatus such as a cellular phone or a portable game device widely used today. An information processing apparatus displays a menu screen containing startup displays of a plurality of applications and, upon user's selection of a particular application on the menu screen, starts up the selected application.

The information processing apparatus can dynamically switch startup displays of applications contained in the menu screen by the following methods, for example.

(1) Switching according to the frequency of recent use

Startup displays of recently used applications are preferentially contained in the menu screen.

(2) Switching according to the current position (cf. e.g. Japanese Unexamined Patent Publication No. 2003-345595)

A particular place and one or more than one application are registered in association with one another in the information processing apparatus, and if the particular place and the current position coincide, one or more than one application associated with the particular place is contained in the menu screen.

SUMMARY OF THE INVENTION

However, because the above method (1) does not take the current condition into consideration and the above method (2) merely compares the current position with the place registered in the information processing apparatus, there is often the case that the menu screen containing a startup display of an application currently desired by a user is not displayed where appropriate.

In light of the foregoing, it is desirable to provide a novel and improved information processing apparatus, information processing method, program and information processing system capable of specifying startup displays to be contained in a startup menu with higher accuracy.

According to an embodiment of the present invention, there is provided an information processing apparatus that includes a storage unit to store reference parameter information made up of a plurality of pieces of parameter information and associated with each program, an acquisition unit to acquire the plurality of pieces of parameter information of current time, a specifying unit to specify a program associated with a reference parameter similar to the plurality of pieces of parameter information of current time, and a display control unit to create a startup menu screen containing a startup display of a program according to a specified result by the specifying unit.

The information processing apparatus may further include an information management unit to update the reference parameter information stored in the storage unit by using the plurality of pieces of parameter information at startup of each program.

The plurality of pieces of parameter information may at least include temporal information and positional information. Further, the temporal information may include time information and day-of-week information.

The information processing apparatus may further include a communication unit capable of communicating with an information server storing reference parameter information, and the storage unit may store reference parameter information received from the information server by the communication unit.

The information processing apparatus may further include a communication unit to transmit the reference parameter information stored in the storage unit to an information server.

The information server may store reference parameter information received from a plurality of information processing apparatus with respect to each information processing apparatus, and, upon receiving reference parameter information from the communication unit, the information server may transmit a reference parameter of an information processing apparatus similar to the reference parameter information in return.

The specifying unit may specify a program by using a reference parameter stored in the storage unit and a reference parameter transmitted from the information server.

The information processing apparatus may further include a communication unit to transmit the plurality of pieces of parameter information of current time to an information server storing reference parameter information in association with each program, and the information server may specify a program associated with a reference parameter similar to the plurality of pieces of parameter information of current time among stored programs and transmit a list of the program to the communication unit.

The specifying unit may determine parameter information to be used for specifying a program based on one parameter information among the plurality of pieces of parameter information of current time.

The specifying unit may change parameter information to be used for specifying a program according to conditions of user operation.

The information management unit may calculate center parameter information of reference parameter information of a plurality of programs having similarity of a threshold or higher, and the specifying unit may specify a program by using the center parameter information as the plurality of pieces of parameter information of current time.

The specifying unit may specify a program by using other center parameter information as the plurality of pieces of parameter information of current time according to user operation.

The plurality of pieces of parameter information may include connection destination identification information indicating an external device connected to the information processing apparatus. Further, the information processing apparatus may be capable of transmitting and receiving the reference parameter information stored in the storage unit to and from another information processing apparatus.

According to another embodiment of the present invention, there is provided an information processing method including the steps of storing reference parameter information made up of a plurality of pieces of parameter information and associated with each program, acquiring the plurality of pieces of parameter information of current time, specifying a program associated with a reference parameter similar to the plurality of pieces of parameter information of current time, and creating a startup menu screen containing a startup display of a program according to a specified result.

According to another embodiment of the present invention, there is provided a program for causing a computer to function as an information processing apparatus including an information management unit to record reference parameter information made up of a plurality of pieces of parameter information and associated with each program on a storage unit, an acquisition unit to acquire the plurality of pieces of parameter information of current time, a specifying unit to specify a program associated with a reference parameter similar to the plurality of pieces of parameter information of current time, and a display control unit to create a startup menu screen containing a startup display of a program according to a specified result by the specifying unit.

According to another embodiment of the present invention, there is provided an information processing system that includes an information server storing reference parameter information made up of a plurality of pieces of parameter information and associated with each program, and an information processing apparatus including an acquisition unit to acquire the plurality of pieces of parameter information of current time, a specifying unit to specify a program associated with a reference parameter similar to the plurality of pieces of parameter information of current time in the information server, and a display control unit to create a startup menu screen containing a startup display of a program according to a specified result by the specifying unit.

According to the embodiments of the present invention described above, it is possible to specify startup displays to be contained in a startup menu with higher accuracy.

BRIEF DESCRIPTION OF THE DRAWINGS

FIG. 5 is an explanatory view showing an example of reference parameter information.

DETAILED DESCRIPTION OF THE PREFERRED EMBODIMENTS

Figure 1:
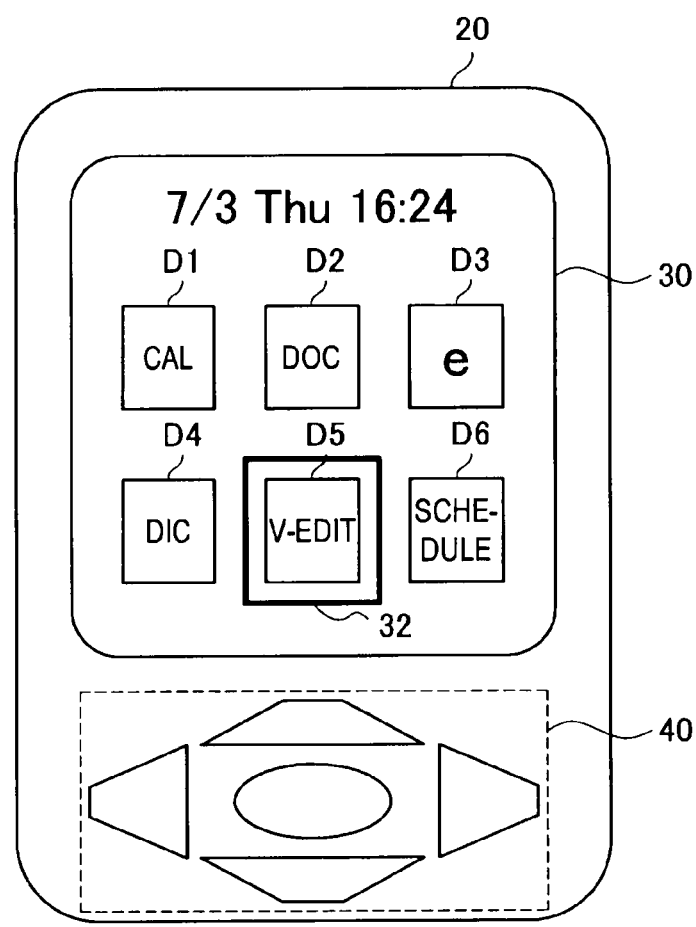
FIG. 1 is an external view of a cellular phone according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
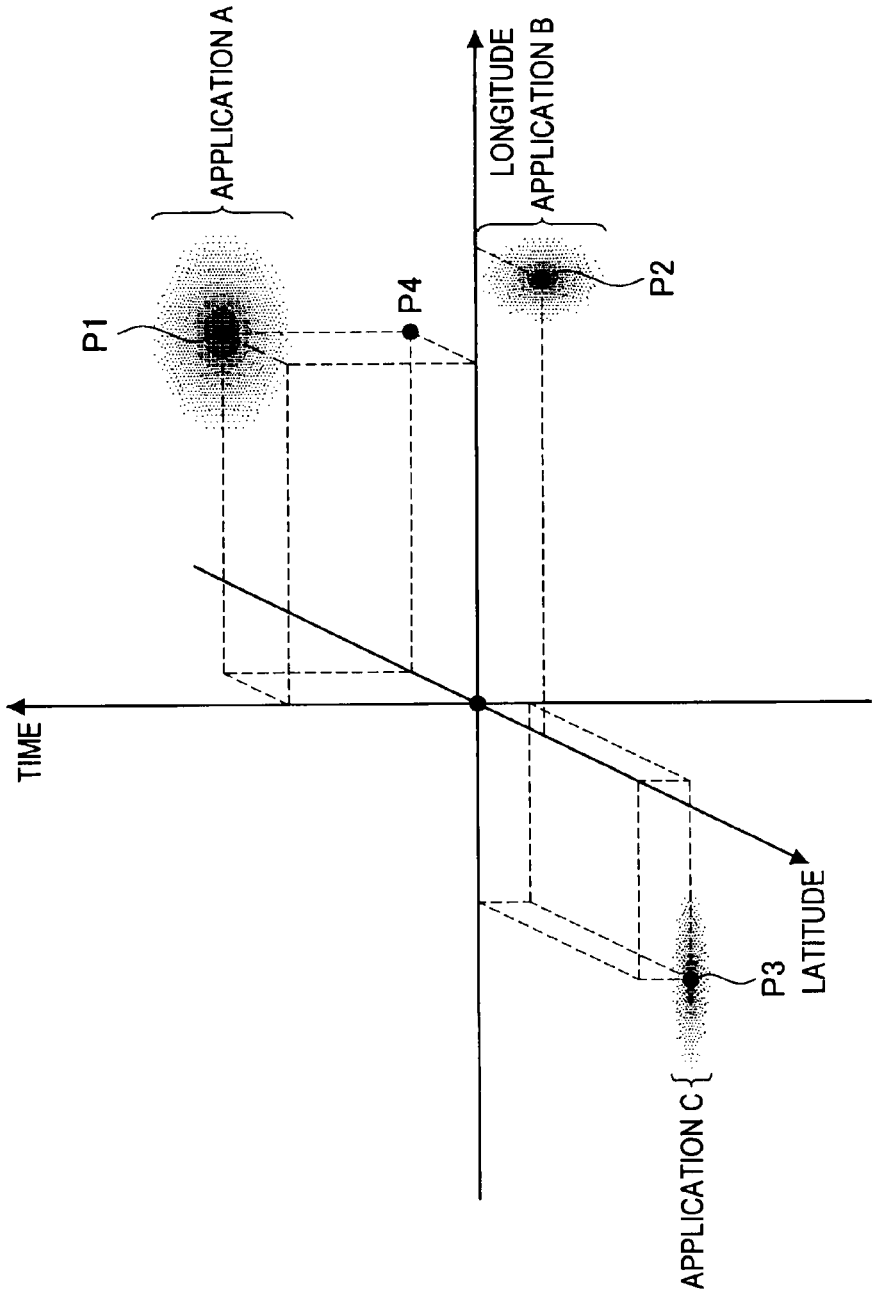
FIG. 2 is an explanatory view showing a specific example of reference parameter information stored in a cellular phone.

Preferred embodiments of the present invention will be described hereinafter in the following order:

(1) First embodiment
  (1-1) Outline of the cellular phone according to the first embodiment
  (1-2) Hardware configuration of the cellular phone according to the first embodiment
  (1-3) Functions of the cellular phone according to the first embodiment
  (1-4) Operation of the cellular phone according to the first embodiment
  (1-5) Supplementary explanation of the first embodiment
    (Alternative example 1-1)
    (Alternative example 1-2)
    (Alternative example 1-3)
    (Other supplementary explanation)
(2) Second embodiment
(3) Summary (1) First Embodiment (1-1) Outline of the Cellular Phone According to the First Embodiment A cellular phone 20 according to a first embodiment of the present invention is described hereinafter with reference to FIGS. 1 and 2.

FIG. 1 is an external view of the cellular phone 20 according to the first embodiment. Referring to FIG. 1, the cellular phone 20 includes a display unit 30 and an operating unit 40. Various kinds of applications (programs) are installed in the cellular phone 20, so that the cellular phone 20 can perform a variety of functions in addition to a telephone function, which has been a principal use. Each application may be installed at the time of manufacture of the cellular phone 20 or may be installed by downloading.

The display unit 30 displays various screens generated inside the cellular phone 20. In FIG. 1, a startup menu screen for a user to select an application to start up is shown as an example of a screen displayed on the display unit 30.

The startup menu screen contains icons D1 to D6 (startup displays) of a plurality of applications and a cursor 32 as shown in FIG. 1. Specifically, the startup menu screen in FIG. 1 contains an icon D1 of a calculation application, an icon D2 of a document preparation application and an icon D3 of an Internet application in the upper part of the screen. The startup menu screen further contains an icon D4 of a dictionary application, an icon D5 of a video editing application and an icon D6 of a schedule management application in the lower part of the screen.

A user can move the cursor 32 to any one of the icons D1 to D6 contained in the startup menu screen by using the operating unit 40 and further direct the startup of an application corresponding to the icon D at which the cursor 32 is placed by using the operating unit 40. Given the direction of the startup of a particular application, the cellular phone 20 starts up the application and displays a screen related to the application on the display unit 30.

The icons D1 to D6 are screen designs that are used for an operation necessary to set the cellular phone 20 to a state ready to perform a given function. Although FIG. 1 shows an example where the icons D1 to D6 are formed by characters, the icons D1 to D6 may be shapes, patterns, colors or a combination of those.

Further, FIG. 1 shows the cellular phone 20 just as an example of the information processing apparatus. For example, the information processing apparatus may be a PC (Personal Computer), a home video processing device (e.g. a DVD recorder, a videocassette recorder etc.), a PHS (Personal Handyphone System), a portable sound playback device, a portable video processing device or the like. Alternatively, the information processing apparatus may be a PDA (Personal Digital Assistants), a home game device, a portable game device, an electrical household appliance or the like.

In the case where six or more kinds of applications shown in FIG. 1 are installed in the cellular phone 20, it is difficult to allow icons D of all applications to be contained in one startup menu screen. Thus, the cellular phone 20 selects a part of applications and displays the startup menu screen containing the icons D of the selected applications. If the startup menu screen does not contain the icon D of the application which a user wishes to start up, the user can change or switch the icons D contained in the startup menu screen by using the operating unit 40.

Therefore, it enhances the convenience of users if the startup menu screen that contains the icon D of the application which a user wishes to start up can be displayed from the start. The cellular phone 20 according to the first embodiment is invented from such a point of view, and it is possible to display the startup menu screen that contains more appropriate icons D based on the similarity between multidimensional parameter information at the startup of each application in the past and multidimensional parameter information at the current time. Hereinafter, the outline of the functions of the cellular phone 20 according to the first embodiment is described with reference to FIG. 2, and then the cellular phone 20 according to the first embodiment is described in detail with reference to FIGS. 3 to 11.

(Outline of the First Embodiment)

The cellular phone 20 according to the first embodiment stores reference parameter information indicating the conditions at the time of starting up an application in the past with respect to each application. The reference parameter information is represented by multidimensional parameter information that is a plurality of pieces of parameter information. Then, the cellular phone 20 according to the first embodiment acquires the current multidimensional parameter information and allows icons of applications associated with reference parameter information similar to the current multidimensional parameter information to be preferentially contained in the startup menu screen.

The reference parameter information stored in the cellular phone 20 is specifically described hereinafter with reference to FIG. 2. The parameter information may be positional information such as latitude and longitude, temporal information such as time and day of week, environmental information such as temperature and weather, motion information such as acceleration and speed, connection destination identification information indicating an externally connected device or the like, for example. Hereinafter, a case where information indicating latitude, longitude and time is used as parameter information is mainly described by way of illustration.

FIG. 2 is an explanatory view showing a specific example of reference parameter information stored in the cellular phone 20. In FIG. 2, multidimensional parameter information as respective reference parameter information at the startup of each application is plotted in the Laplacian coordinate system having the longitude axis, the latitude axis and the time axis. Specifically, reference parameter information of an application A is distributed around coordinates P1, reference parameter information of an application B is distributed around coordinates P2 and reference parameter information of an application C is distributed around coordinates P3.

If the current multidimensional parameter information corresponds to a plot point at coordinates P4, the cellular phone 20 calculates the similarity between the coordinates P4 (the current multidimensional parameter information) and the distribution (reference parameter information) of each application. The cellular phone 20 then preferentially puts the icon of the application having the distribution similar to the coordinates P4 into the startup menu screen. The cellular phone 20 according to the first embodiment can thereby display the startup menu screen that contains the icon of the application which a user wishes to start up with higher accuracy, as described in detail later.

(1-2) Hardware Configuration of the Cellular Phone According to the First Embodiment The hardware configuration of the cellular phone 20 according to the first embodiment is described hereinafter with reference to FIG. 3.

Figure 3:
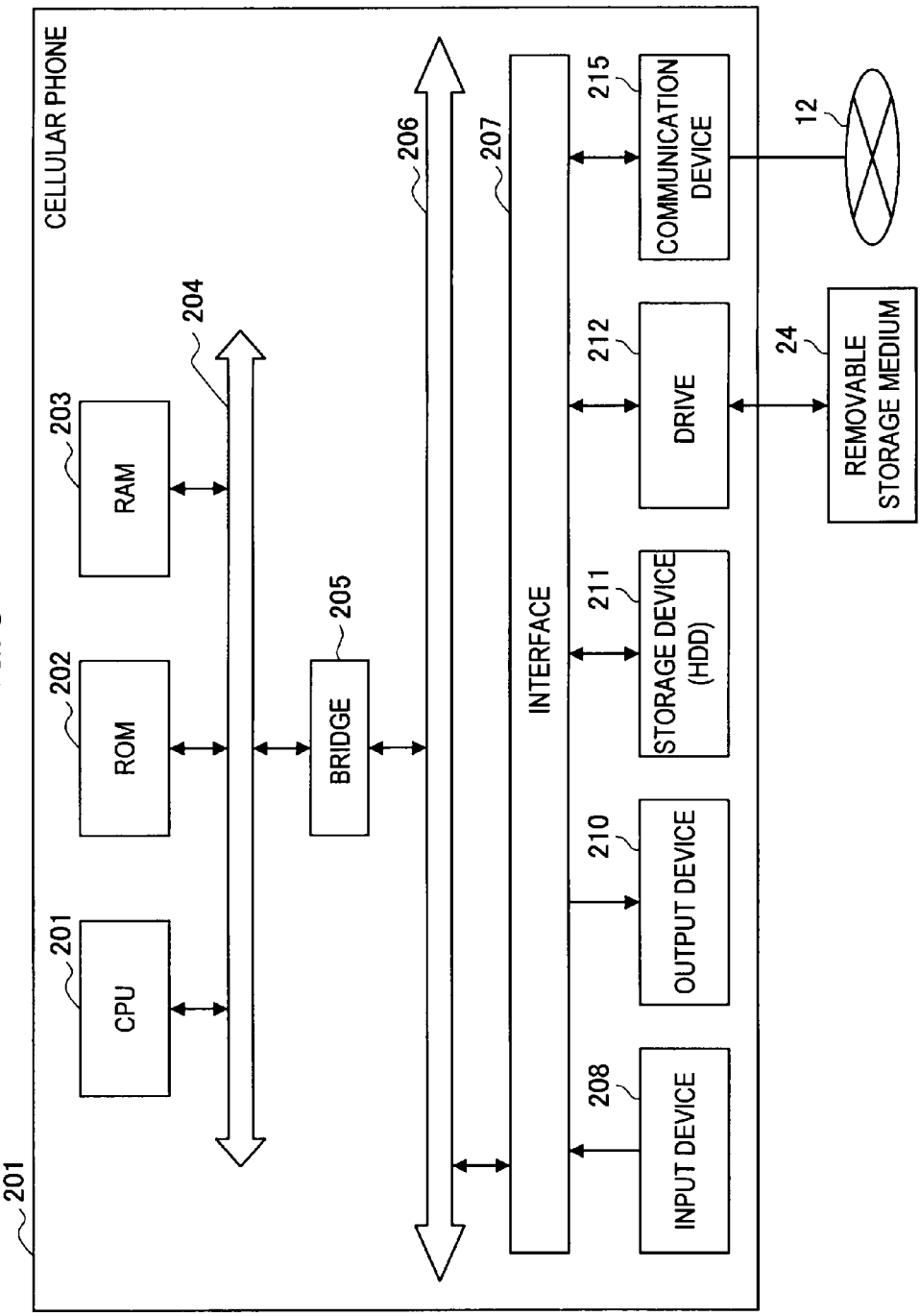
FIG. 3 is a block diagram showing the hardware configuration of a cellular phone.

FIG. 3 is a block diagram showing the hardware configuration of the cellular phone 20. The cellular phone 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, and a communication device 215.

The CPU 201 functions as a processing device and a control device, and it controls the overall operation in the cellular phone 20 according to programs. The CPU 201 may be a microprocessor. The ROM 202 stores programs to be used by the CPU 201, processing parameters and so on. The RAM 203 temporarily stores programs to be used in the execution of the CPU 201, parameters that vary in the execution and so on. The CPU 201, the ROM 202 and the RAM 203 are connected to one another through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from one another, and their functions may be implemented by one bus.

The input unit 208 may include an input means for a user to input information, such as a mouse, a keyboard, a touch panel, a button, a microphone, a switch or a lever, and an input control circuit to generate an input signal based on a user input and output it to the CPU 201, for example. A user of the cellular phone 20 manipulates the input unit 208 (which corresponds to the operating unit 40) to thereby input various data or instruct processing operation to the cellular phone 20.

The output device 210 may include a display device such as a CRT (Cathode Ray Tube) display device, an LCD (Liquid Crystal Display) device, an OLED (Organic Light Emitting Display) device or a lamp, for example. Further, the output device 210 may include a sound output device such as a speaker or a headphone, for example. The output unit 210 may output reproduced contents, for example. Specifically, the display device (which corresponds to the display unit 30) displays various kinds of information such as reproduced video data by texts or images. On the other hand, the sound output device converts reproduced sound data or the like into sound and outputs a result.

The storage device 211 is a device for data storage that is configured as an example of a storage unit of the cellular phone 20 according to the embodiment. The storage device 211 may include a storage medium, a recording device to record data into the storage medium, a reading device to read data from the storage medium, a deleting device to delete data recorded in the storage medium or the like. The storage device 211 may be an HDD (Hard Disk Drive), for example. The storage unit 211 drives a hard disk and stores programs to be executed by the CPU 201 and various data. In the storage device 211, reference parameters, which are described later, are stored in association with applications.

The drive 212 is a reader/writer for storage medium, and it may be incorporated into the cellular phone 20 or attached thereto externally. The drive 212 reads information recorded in a removable storage medium 24 such as a magnetic disk, an optical disk, a magneto-optical disk or semiconductor memory which is attached thereto and outputs the information to the RAM 203.

The communication unit 215 may be a communication interface configured by a communication device or the like to establish connection with the communication network 12, for example. The communication unit 215 may be a communication device compatible with a wireless LAN (Local Area Network), a communication device compatible with a wireless USB, or a wire communication device that performs wired communication.

(1-3) Functions of the Cellular Phone According to the First Embodiment

The functions of the cellular phone 20 according to the first embodiment are described hereinafter with reference to FIGS. 4 to 7.

Figure 4:
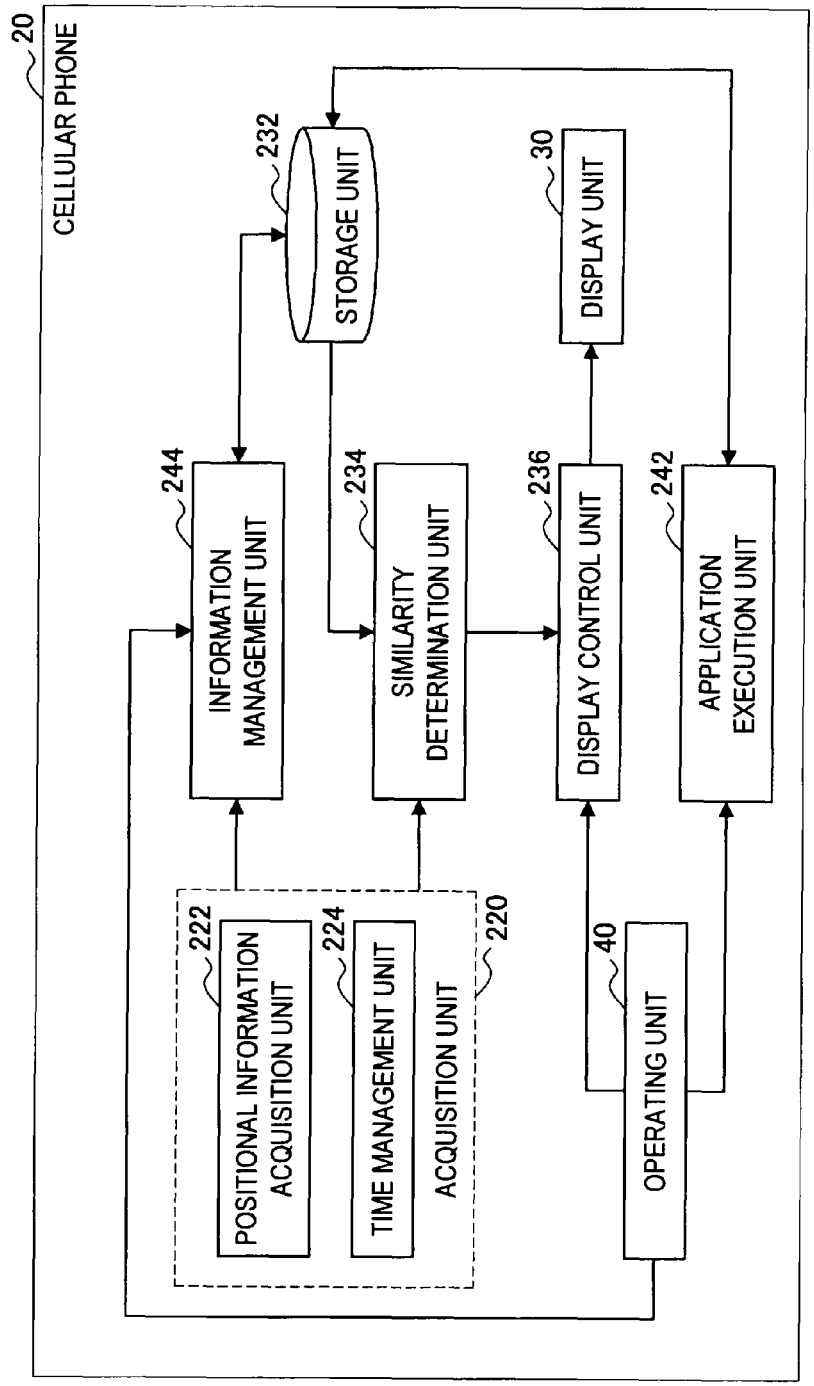
FIG. 4 is a functional block diagram showing the configuration of the cellular phone according to the first embodiment.

FIG. 4 is a functional block diagram showing the configuration of the cellular phone 20 according to the first embodiment. Referring to FIG. 4, the cellular phone 20 includes an acquisition unit 220, a storage unit 232, a similarity determination unit 234, a display control unit 236, an application execution unit 242, an information management unit 244, a display unit 30 and an operating unit 40.

The acquisition unit 220 acquires the current multidimensional parameter information. In FIG. 4, a positional information acquisition unit 222 that acquires positional information such as latitude and longitude and a time management unit 224 that manages temporal information such as time and day of week are shown as an example of the acquisition unit 220. The positional information acquisition unit 222 may be a GPS (Global Positioning System) that measures the current position based on navigation data transmitted from four or more artificial satellites. Alternatively, the positional information acquisition unit 222 may acquire the current position based on the intensity of WiFi waves transmitted from a nearby WiFi base station and the location of the base station.

Further, in the case where the cellular phone 20 uses environmental information such as temperature and weather, motion information such as acceleration and speed, connection destination identification information indicating an externally connected device or the like as parameter information, the acquisition unit 220 may include a sensor for acquiring those information. Alternatively, the acquisition unit 220 may acquire environmental information, for example, by making inquiries to an external information providing device.

The storage unit 232 stores a plurality of applications and reference parameter information, which is multidimensional parameter information at the startup of each application in the past. An example of reference parameter information is described hereinafter with reference to FIG. 5.

FIG. 5 is an explanatory view showing an example of reference parameter information. Referring to FIG. 5, reference parameter information is associated with each application. For example, the reference parameter information indicating latitude "36.53", longitude "154.033", time "20:56" and so on are associated with the application A. Likewise, the reference parameter information indicating latitude "36.04", longitude "153.678", time "8:56" and so on are associated with the application B.

Such reference parameter information may be accumulated by the information management unit 244 each time an application starts up. Further, the storage unit 232 may be a storage medium such as nonvolatile memory, a magnetic disk, an optical disc or an MO (Magneto Optical) disk. Examples of the nonvolatile memory are EEPROM (Electrically Erasable Programmable Read-Only Memory), EPROM (Erasable Programmable ROM) and so on. Examples of the magnetic disk are a hard disk, a discoid magnetic disk and so on. Examples of the optical disc are CD (Compact Disc), DVD-R (Digital Versatile Disc Recordable), BD (Blu-ray Disc (registered trademark)) and so on.

The similarity determination unit 234 determines the similarity between the current multidimensional parameter that is acquired by the acquisition unit 220 and the reference parameter information of each application that is stored in the storage unit 232. An example of a method of determining similarity by the similarity determination unit 234 is described hereinafter with reference to FIG. 6.

Figure 6:
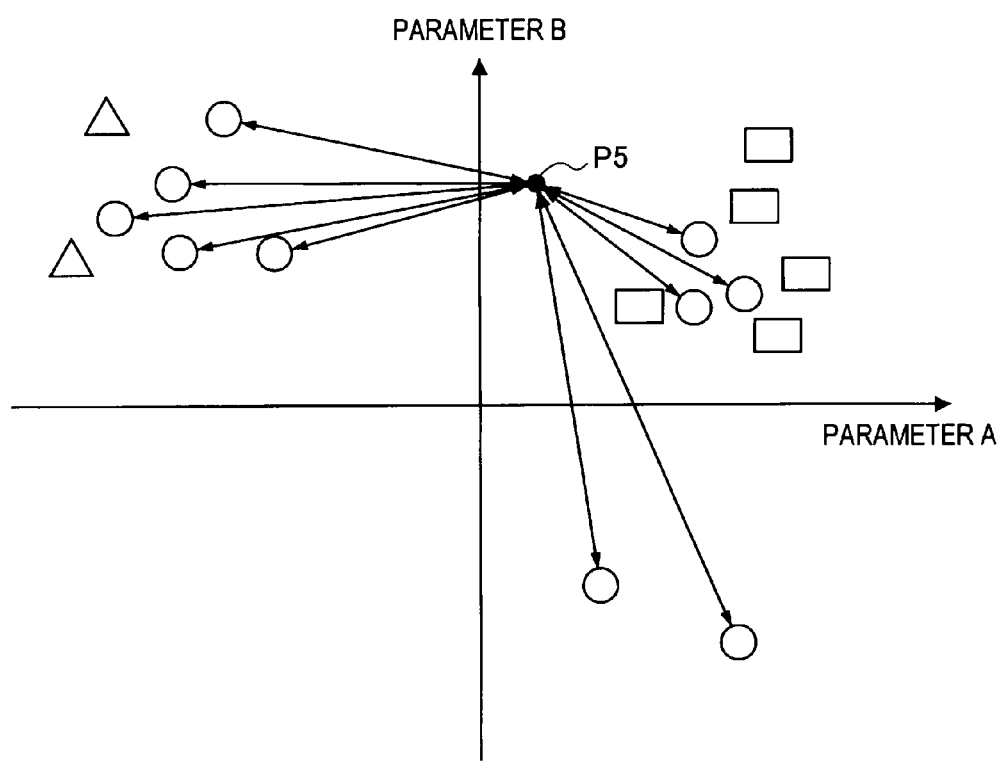
FIG. 6 is an explanatory view showing a method of determining similarity by a similarity determination unit.

FIG. 6 is an explanatory view showing a method of determining similarity by the similarity determination unit 234. Specifically, FIG. 6 illustrates plots of reference parameter information and a plot (P5) of the current time in the two-dimensional coordinates having two axes, i.e. the parameter A and the parameter B, for convenience of description. In FIG. 6, circular plots correspond to reference parameter information of the application A, rectangular plots correspond to reference parameter information of the application B, and triangular plots correspond to reference parameter information of the application C.

The similarity determination unit 234 calculates the distance between the current plot P5 and each plot of the reference parameter information of the application A, calculates an evaluation value that is inversely proportional to the distance with respect to each distance, adds the evaluation values together and thereby obtains the probability of the application A in the current plot P5. Likewise, the similarity determination unit 234 obtains the probability of the applications B and C in the current plot P5 by adding the evaluation values together. The relationship between the distance in the two-dimensional coordinates per unit amount of the parameter A and the distance in the two-dimensional coordinates per unit amount of the parameter B may be set arbitrarily. For example, if the parameter A is time and the parameter B is temperature, the distance in one hour in the parameter A axis and the distance at three degrees in the parameter B may coincide with each other.

Alternatively, the similarity determination unit 234 may obtain the average value of the distances between the current plot P5 and the respective plots of the reference parameter information of the application A as the probability of the application A in the current plot P5. Likewise, the similarity determination unit 234 may obtain the average value of the distances between the current plot P5 and the respective plots of the reference parameter information of the applications B and C as the probability of the applications B and C in the current plot P5.

Then, the similarity determination unit 234 sequentially specifies the applications up to the number of icons that can be contained in the startup menu screen in the descending order of probability, and notifies the specified applications to the display control unit 236. Thus, the similarity determination unit 234 has a functions as a specifying unit that specifies the applications associated with the reference parameter information similar to the current multidimensional parameter information and notifies the specified applications to the display control unit 236.

The display control unit 236 creates the startup menu screen that contains the icons of the applications notified from the similarity determination unit 234 and causes the display unit 30 to display the startup menu screen. If the startup menu screen is displayed on the display unit 30 and any icon is selected by a user via the operating unit 40, the application execution unit 242 starts up the application corresponding to the selected icon.

Further, if any icon is selected by a user via the operating unit 40, the information management unit 244 adds the multidimensional parameter at the time of selection to the storage unit 232 as the reference parameter information of the application corresponding to the selected icon.

As described above, in the first embodiment, the similarity determination unit 234 specifies the icons of the applications to be contained in the startup menu screen based on the similarity between the current multidimensional parameter information and the reference parameter information. As a result, the following advantages are obtained in the first embodiment.

(1) Even if the multidimensional parameter varies such as while traveling from home to work, icons contained in the startup menu screen can gradually change from icons of applications often used at home to icons of applications often used at work.

(2) Even if a user's behavior pattern is deviated from a pre-planned pattern such as when going to work on holidays, the startup menu screen that contains icons of both applications often used on holidays and applications often used at work can be displayed.

Figure 7:
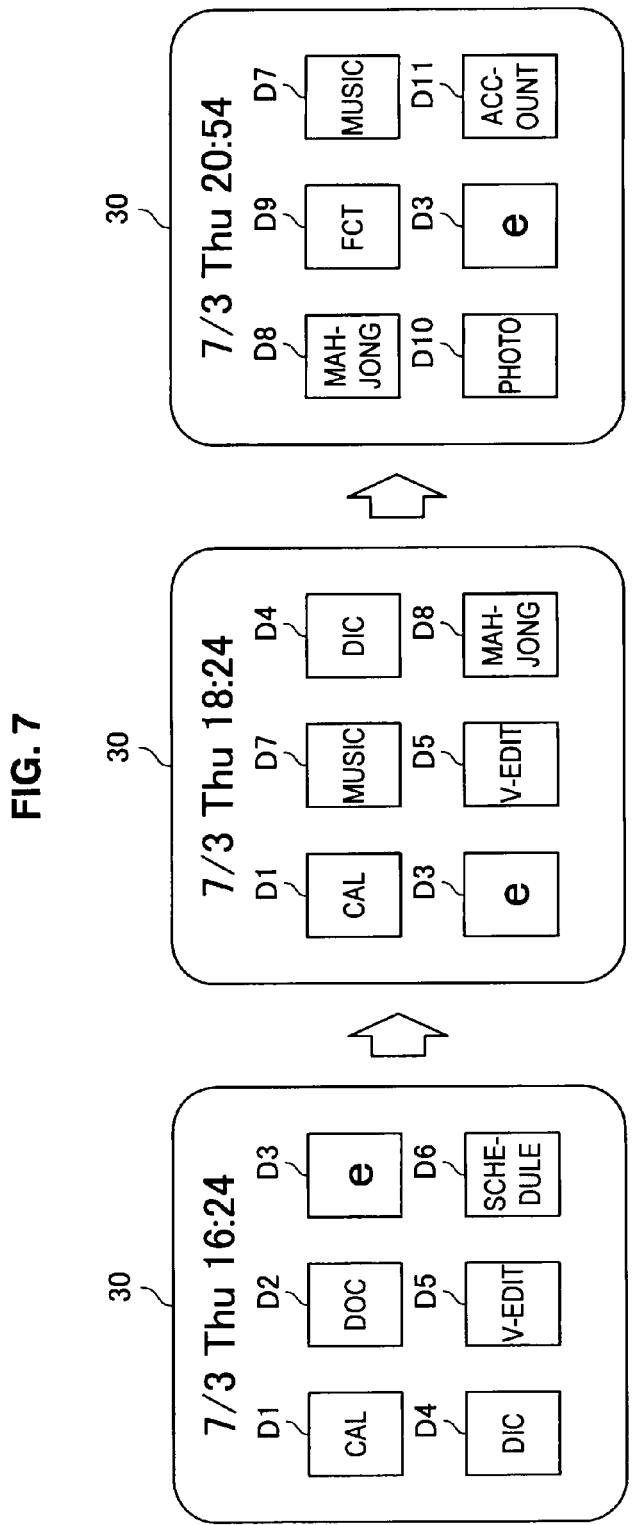
FIG. 7 is an explanatory view showing the way icons contained in a startup menu screen gradually change.

A specific example of the above (1) is described hereinafter with reference to FIG. 7. FIG. 7 is an explanatory view showing the way the icons contained in the startup menu screen gradually change while a certain user goes back home from work. As shown in the left part of FIG. 7, when a user of the cellular phone 20 is at work, the icons D1 to D6 such as a calculation application, a document preparation application and a schedule management application, which are often used at work, are contained in the startup menu screen.

Then, when the user is on the way home, the icons in the startup menu screen start to include the icons D7, D8 and so on such as a music playback application and a mahjong application, which are often used at home, as shown in the center part of FIG. 7. Further, when the user comes back home, the icons contained in the startup menu screen change to the icons D3, D7 to D11 such as a music playback application, a foreign currency trading application and a mahjong application, which are often used at home, as shown in the right part of FIG. 7.

(1-4) Operation of the Cellular Phone According to the First Embodiment

The flow of an information processing method executed in the cellular phone according to the first embodiment is described hereinafter with reference to FIG. 8.

Figure 8:
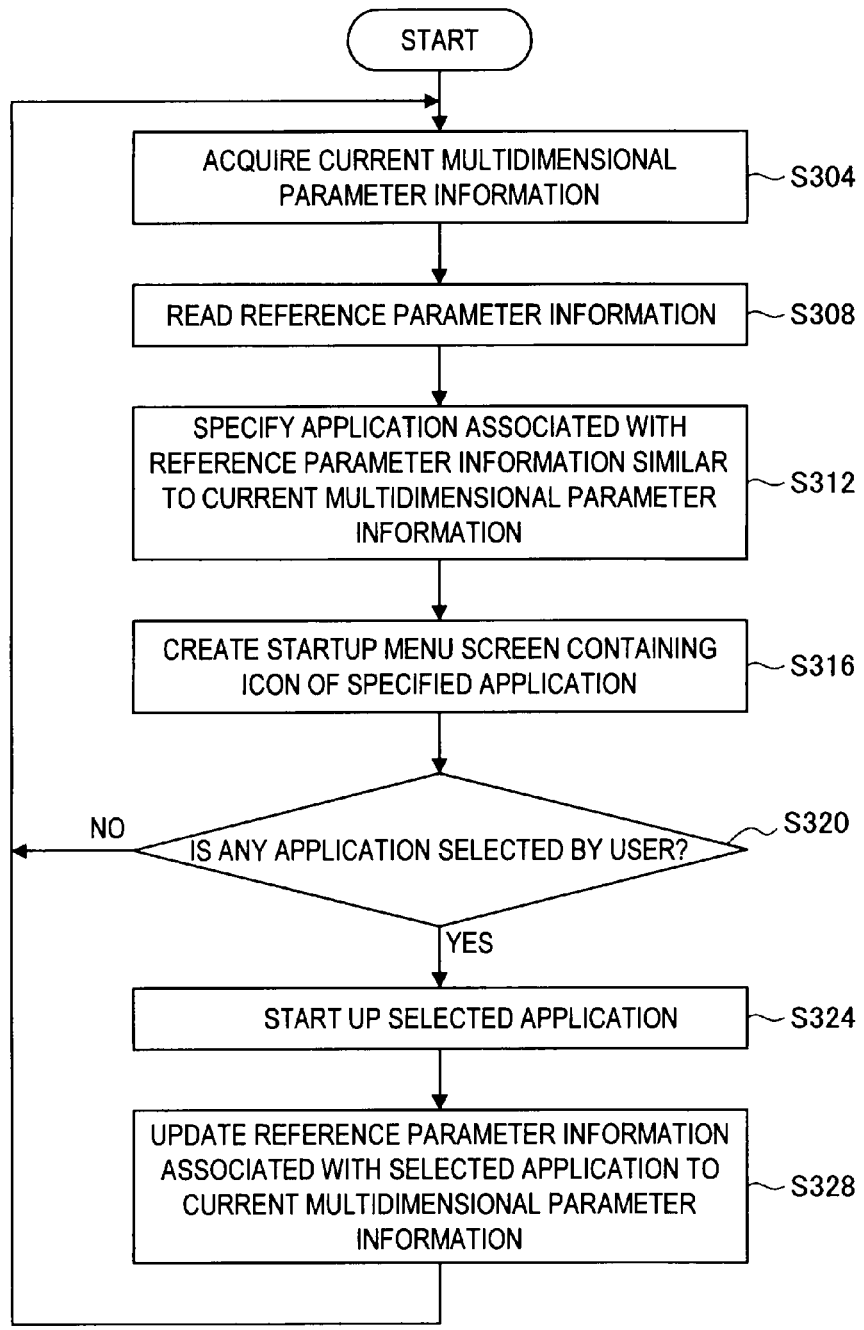
FIG. 8 is a flowchart showing the flow of an information processing method executed in the cellular phone according to the first embodiment.

FIG. 8 is a flowchart showing the flow of an information processing method that is executed in the cellular phone 20 according to the first embodiment. As shown in FIG. 8, the acquisition unit 220 acquires the current multidimensional parameter information firstly (S304). Next, the similarity determination unit 234 reads the reference parameter information from the storage unit 232 (S308) and specifies applications associated with the reference parameter information similar to the current multidimensional parameter information (S312).

Then, the display control unit 236 creates the startup menu screen that contains the icons of the applications specified by the similarity determination unit 234 and controls the display unit 30 to display the screen (S316). After that, if any icon (application) contained in the startup menu screen is selected via the operating unit 40 (S320), the application execution unit 242 starts up the selected application (S324). Further, the information management unit 244 updates the reference parameter information associated with the selected application by using the multidimensional parameter information at the time of selection (the current time) (S328).

(1-5) Supplementary Explanation of the First Embodiment

The cellular phone 20 according to the first embodiment is described above with reference to FIGS. 1 to 8. Hereinafter, alternative examples and supplementary explanation of the cellular phone 20 according to the first embodiment are described.

(Alternative Example) 1-1

In the above-described first embodiment, the example where the similarity determination unit 234 calculates the distance between the current plot P5 and the plots of the respective reference parameter information with respect to each application is described. In this method, however, it is necessary for the storage unit 232 to store the multidimensional parameter information that is as much as the number of startups in the past. Further, the amount of calculations in the similarity determination unit 234 is large. In light of this, the storage unit 232 may store the weighted reference parameter information, and the similarity determination unit 234 may specify applications based on the weighted reference parameter information in an alternative example 1-1. The weighing of reference parameter information is described hereinafter with reference to FIG. 9.

Figure 9:
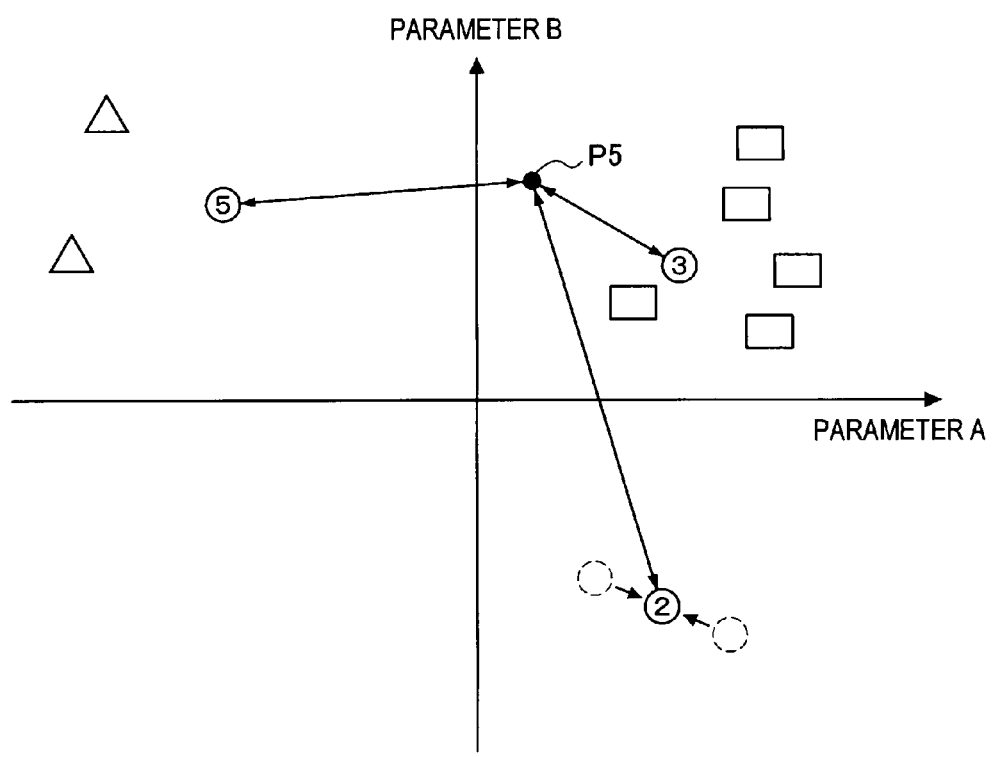
FIG. 9 is an explanatory view showing weighing of reference parameter information.

FIG. 9 is an explanatory view showing the weighing of reference parameter information. The information management unit 244 may calculate the center position of reference parameter information of the same application located at the plots closer than a threshold distance to each other and assign weights corresponding to the number of pieces of the relevant reference parameter information to the center position. Specifically, in the first quadrant of the two-dimensional coordinate system shown in FIG. 6, the plots of three pieces of reference parameter information of the application A are in close proximity. Thus, the information management unit 244 calculates the center position of the plots of the three pieces of reference parameter information and assigns the weights 3 to the center position. In the same manner, the information management unit 244 integrates the plots in close proximity in the second quadrant and the fourth quadrant of the two-dimensional coordinate system shown in FIG. 6.

Then, the information management unit 244 causes the storage unit 232 to store reference parameter information and weights corresponding to each center position instead of the respective reference parameter information being integrated. Further, the similarity determination unit 234 calculates the distance between the current plot P5 and each center position and multiplies the distance by the weights assigned to each center position, thereby obtaining the probability of the application A.

In this configuration, the data amount of reference parameter information is reduced, and it is thereby possible to make effective use of the storage capacity of the storage unit 232. Further, the amount of calculations in the similarity determination unit 234 is also reduced, and it is thereby possible to reflect the current multidimensional parameter on the startup menu screen more quickly.

(Alternative Example) 1-2

Although the example where applications are specified on the basis of the current multidimensional parameter that is acquired by the acquisition unit 220 is described in the first embodiment, applications may be specified on the basis of a multidimensional parameter that is different from the current multidimensional parameter in an alternative example 1-2.

Specifically, if plots of a plurality of applications exist densely in the coordinate system on which reference parameter information is reflected as plots, the information management unit 244 calculates the center of the dense range (or plots) as center parameter coordinates. In other words, the information management unit 244 calculates the center parameter coordinates of the plots of a plurality of applications having the similarity of a threshold or higher.

Figure 10:
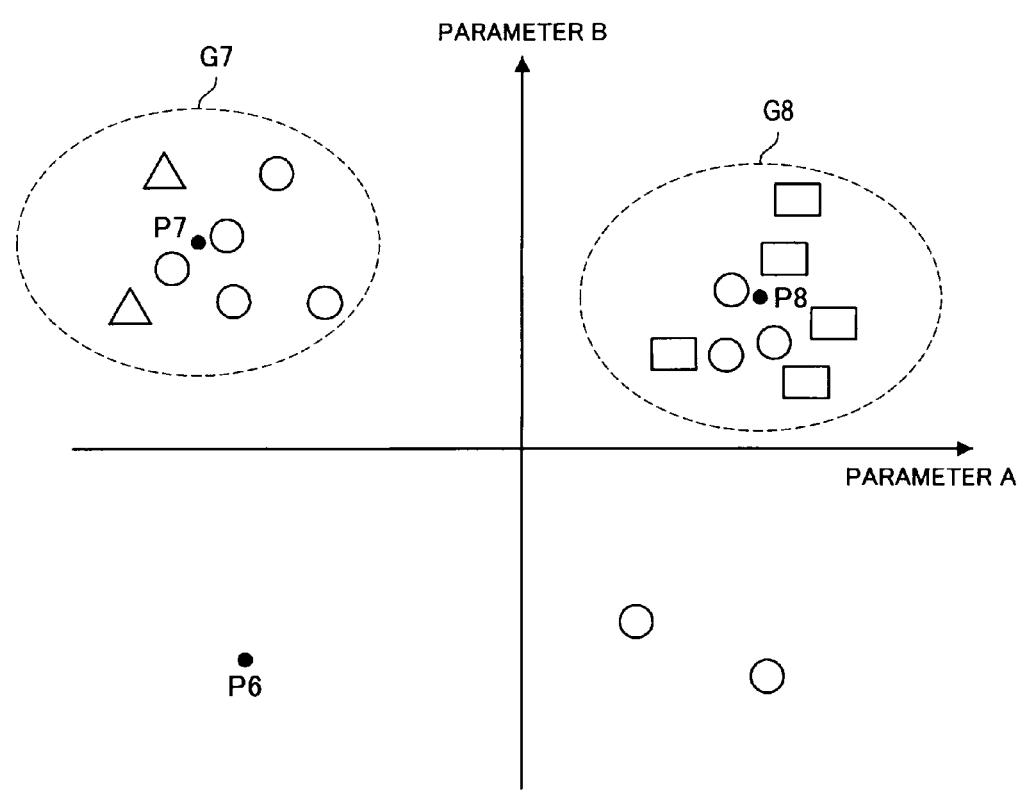
FIG. 10 is an explanatory view showing a specific example of center parameter coordinates.

FIG. 10 is an explanatory view showing a specific example of the center parameter coordinates. As shown in FIG. 10, because the plots of the applications A and C exist in the range G7, the information management unit 244 calculates the center parameter coordinates P7 of the plots of the applications A and C. Likewise, because the plots of the applications A and B exist in the range G8, the information management unit 244 calculates the center parameter coordinates P8 of the plots of the applications A and B. Such calculation of the center parameter coordinates is sometimes called clustering or grouping.

Then, the similarity determination unit 234 specifies applications on the assumption that the current multidimensional parameter corresponds to the center parameter coordinates P7 or P8 automatically or by user operation even if a plot point P6 corresponds to the current multidimensional parameter. Further, the similarity determination unit 234 may switch the center parameter coordinates to be assumed to correspond to the current multidimensional parameter according to user operation. In this configuration, the following advantages are obtained which are described hereinafter with reference to FIG. 11, for example.

Figure 11:
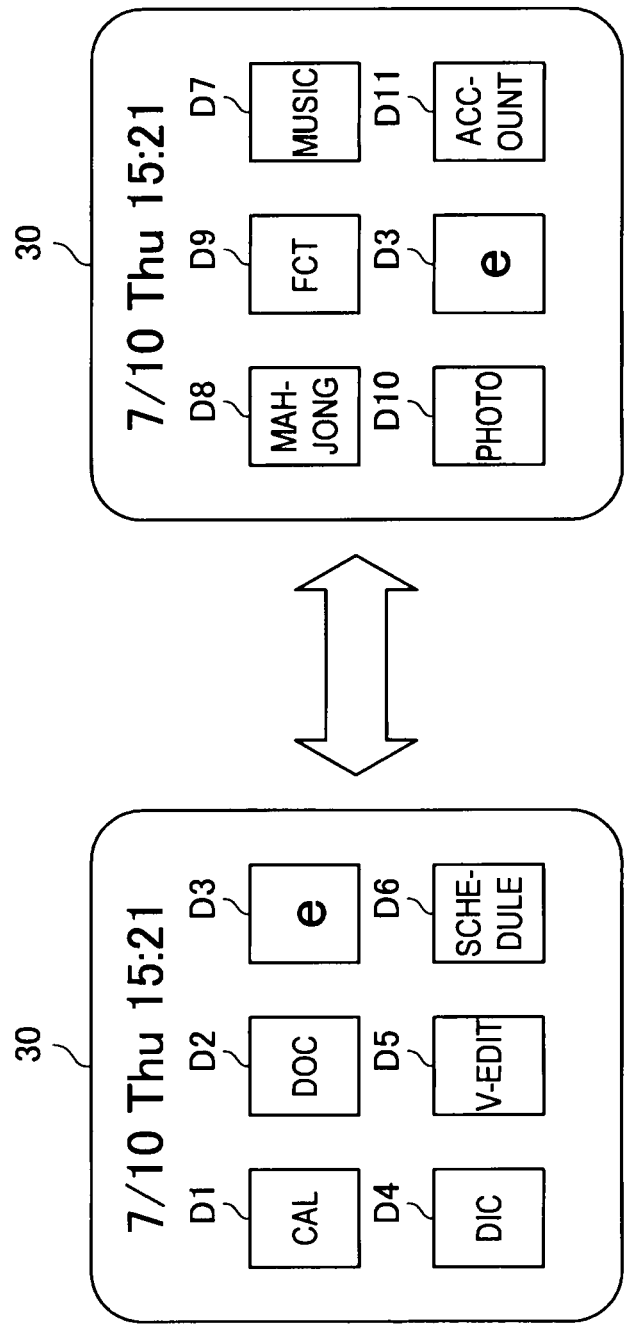
FIG. 11 is an explanatory view showing the way of switching startup menu screens implemented by an alternative example 1-2.

FIG. 11 is an explanatory view showing the way of switching the startup menu screens, which is implemented by an alternative example 1-2. It is assumed that the respective reference parameter information of applications that are often used at work is similar to one another, and the center parameter coordinates of the reference parameter information are calculated. It is also assumed that the respective reference parameter information of applications that are often used at home is similar to one another, and the center parameter coordinates of the reference parameter information are calculated.

Accordingly, in the alternative example 1-2, it is possible to easily switch the icons contained in the startup menu screen between the icons D1 to D6 of the applications often used at work and the icons D3 and D7 to D11 of the applications often used at home, for example, as shown in FIG. 1. In this configuration, even when an icon desired by a user is not contained in the startup menu screen, it is possible to switch the startup menu screen at once, so that the icon desired by the user can be contained in the startup menu screen.

(Alternative Example) 1-3

Although the example where the similarity determination unit 234 specifies applications by using always the same parameter information is described in the first embodiment, the embodiment is not limited thereto. For example, the similarity determination unit 234 may determine which of parameter information is to be used for specifying applications based on one current parameter information. Specifically, the similarity determination unit 234 may determine the use of positional information and speed information during the daytime and the use of only positional information during the nighttime based on temporal information. Further, the similarity determination unit 234 may change (add) the parameter information to use according to the conditions of user operation such as when user operation is not made for a given period of time or when given user operation is made. As a result, the icons contained in the startup menu screen vary according to the conditions of user operation.

(Other Supplementary Explanation)

Although the example where temporal information and positional information are used as multidimensional parameter information is mainly described in the first embodiment, the embodiment is not limited thereto. For example, connection destination identification information that indicates the kind of another information processing apparatus connected to the cellular phone 20 may be used as multidimensional parameter information. In this configuration, it is possible to allow the startup menu screen to contain the icon of a photograph application when a digital camera is connected to the cellular phone 20 and contain the icon of a music playback application when an in-vehicle device is connected to the cellular phone 20, for example.

(2) Second Embodiment

The cellular phone 20 according to the first embodiment is described in the foregoing. In the following, a second embodiment of the present invention is described with reference to FIGS. 12 to 14.

Figure 12:
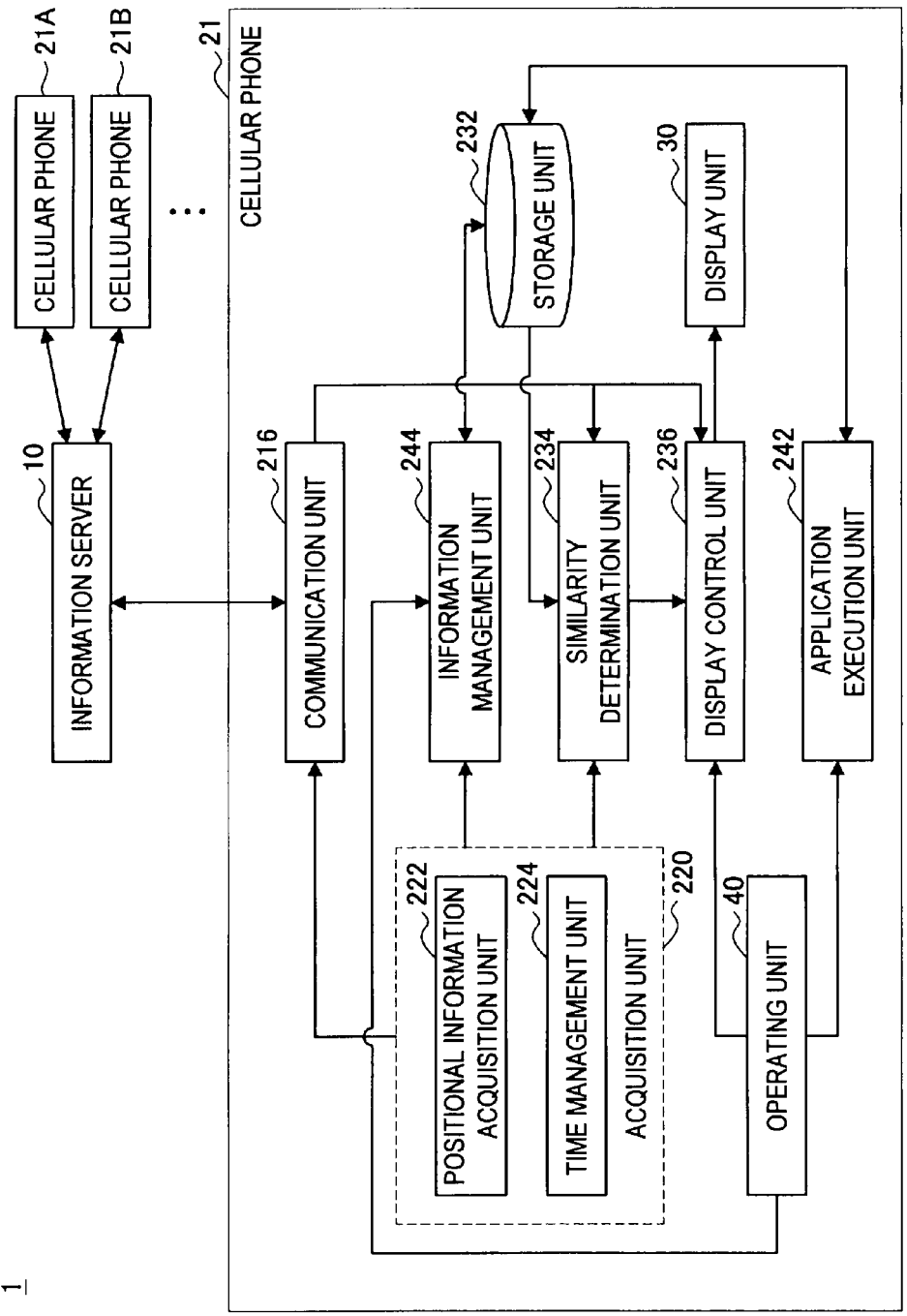
FIG. 12 is a functional block diagram showing the configuration of an information processing system according to a second embodiment of the present invention.

FIG. 12 is a functional block diagram showing the configuration of an information processing system 1 according to the second embodiment. Referring to FIG. 12, the information processing system 1 according to the second embodiment includes an information server 10, a cellular phone 21, and other cellular phones 21A, 21B and so on. Further, the cellular phone 21 includes a communication unit 216, an acquisition unit 220, a storage unit 232, a similarity determination unit 234, a display control unit 236, an application execution unit 242, an information management unit 244, a display unit 30 and an operating unit 40. Differences of the cellular phone 21 from the cellular phone 20 according to the first embodiment are mainly described below, and explanation about a large part of the same points is omitted.

The information server 10 receives reference parameter information acquired in the cellular phone 21 or the other cellular phone 21A, 21B from the cellular phone 21 or the other cellular phone 21A, 21B and accumulates or updates the received reference parameter information. Specifically, the information server 10 may accumulate reference parameters with respect to each transmission source of the reference parameters or accumulate reference parameters regardless of the transmission source of the reference parameters.

The communication unit 216 is an interface with the information server 10 and transmits and receives various kinds of information to and from the information server 10. For example, the communication unit 216 may transmit the current multidimensional parameter acquired by the acquisition unit 220 to the information server 10 and receive an application list from the information server 10 as shown in FIG. 13.

Figure 13:
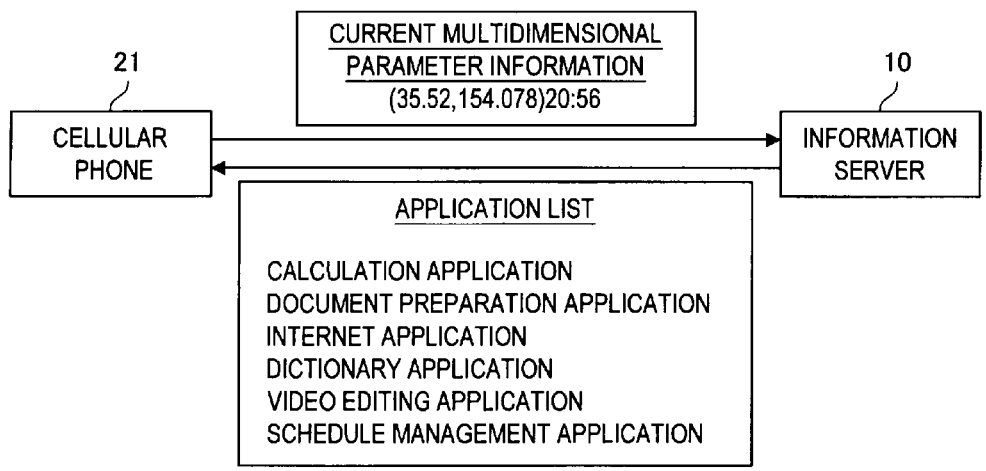
FIG. 13 is an explanatory view showing an example of information exchanged between a cellular phone and an information server.

FIG. 13 is an explanatory view showing an example of information exchanged between the cellular phone 21 and the information server 10. Consider the case where the current multidimensional parameter information (latitude 35.52, longitude 154.078 and time 20:56) is transmitted from the communication unit 216 of the cellular phone 21 to the information server 10 as shown in FIG. 13. In such a case, the information server 10 extracts reference parameter information that is similar to the received multidimensional parameter information from the accumulated reference parameter information and specifies applications associated with the extracted reference parameter information. Then, the information server 10 transmits an application list, which is a list of the specified applications, to the cellular phone 21 as shown in FIG. 13.

If the application list is received by the communication unit 216, the display control unit 236 creates the startup menu screen that contains the icons of the applications included in the application list, and the display unit 30 displays the created startup menu screen. The communication unit 216 may transmit the reference parameter information stored in the storage unit 232 to the information server 10 or transmit the multidimensional parameter information at the time of selection as the reference parameter information each time the application is selected.

Figure 14:
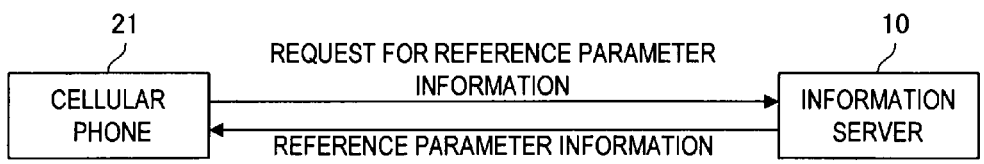
FIG. 14 is an explanatory view showing another example of information exchanged between a cellular phone and an information server.

Further, the communication unit 216 may request reference parameter information to the information server 10 and receive the reference parameter information transmitted from the information server 10 in response to the request as shown in FIG. 14.

FIG. 14 is an explanatory view showing another example of information exchanged between the cellular phone 21 and the information server 10. Consider the case where the cellular phone 21 requests the information server 10 to transmit reference parameter information as shown in FIG. 14. The cellular phone 21 may request the transmission of reference parameter information when sufficient reference parameter information is not stored in the storage unit 232 of the cellular phone 21, when reference parameter information similar to the current multidimensional parameter information is not stored in the storage unit 232 or the like. Further, the cellular phone 21 may transmit the reference parameter information stored in the storage unit 232 together with the request.

Receiving the request for transmitting reference parameter information from the cellular phone 21, the information server 10 transmits at least part of the reference parameter information that is accumulated in association with applications to the cellular phone 21. It is assumed that the information server 10 accumulates reference parameters with respect to each transmission source of reference parameter information and receives reference parameter information together with the request from the cellular phone 21. In such a case, the information server 10 may transmit reference parameter information highly similar to the reference parameter information received from the cellular phone 21 among the reference parameter information accumulated with respect to each transmission source. In other words, the information server 10 may transmit the reference parameter information of another cellular phone having the similar startup history of applications to the cellular phone 21.

If the communication unit 216 receives the reference parameter information associated with applications from the information server 10, the similarity determination unit 234 specifies applications using the reference parameter information.

Specifically, the similarity determination unit 234 may specify for display applications associated with reference parameter information similar to the current multidimensional parameter information among the reference parameter information received by the communication unit 216. Alternatively, the similarity determination unit 234 may integrate the reference parameter information received by the communication unit 216 and the reference parameter information stored in the storage unit 232. Further, the similarity determination unit 234 may specify for display applications associated with reference parameter information similar to the current multidimensional parameter information among the integrated reference parameter information.

The display control unit 236 creates the startup menu screen that contains the icons of the applications specified by the similarity determination unit 234 and causes the display unit 30 to display the startup menu screen. If the startup menu screen is displayed on the display unit 30 and any icon is selected by a user via the operating unit 40, the application execution unit 242 starts up the application corresponding to the selected icon.

(Summary)

As described in the foregoing, according to the first embodiment of the present invention, the similarity determination unit 234 specifies the icons of the applications to be contained in the startup menu screen based on the similarity between the current multidimensional parameter information and the reference parameter information. Therefore, according to the first embodiment, even when the current multidimensional parameter varies, for example, it is possible to gradually change the icons contained in the startup menu screen in accordance with the variation of the multidimensional parameter information. Further, even when a user's behavior pattern is deviated from a pre-planned pattern, it is possible to display the startup menu screen that contains the icons corresponding to the current multidimensional parameter. Furthermore, even when an icon desired by a user is not contained in the startup menu screen, it is possible to switch the startup menu screen at once so as to contain the icon desired by the user with use of clustering (center parameter coordinates).

It should be understood by those skilled in the art that various modifications, combinations, sub-combinations and alterations may occur depending on design requirements and other factors insofar as they are within the scope of the appended claims or the equivalents thereof.

For example, although the example where the communication unit 216 receives reference parameter information from the information server 10 is described in the second embodiment, the present invention is not limited thereto. For example, the communication unit 216 may receive reference parameter information from another cellular phone 21A or 21B. Further, although the example where all icons to be contained in the startup menu screen are specified based on the current multidimensional parameter information and the reference parameter information is described above, the present invention is not limited thereto. For example, an icon to be always contained in the startup menu screen may be set by a user in the cellular phone 20 or 21. In such a case, the cellular phone 20 or 21 may display the startup menu screen that contains the icon set by a user and the icon specified based on the current multidimensional parameter information and the reference parameter information.

Further, it is not always necessary to perform each step in the processing of the cellular phone 20 in chronological order according to the sequence shown in the flowchart. For example, each step in the processing of the cellular phone 20 may include processing performed in parallel or individually (e.g. parallel processing or object processing). Furthermore, it is possible to create a computer program that causes hardware such as the CPU 201, the ROM 202 or the RAM 203 incorporated in the cellular phone 20 to perform the equal function to each element of the cellular phone 20 described above. Further, a storage medium that stores such a computer program may be provided. Furthermore, each functional block shown in the functional block diagrams of FIG. 4 and FIG. 12 may be implemented by hardware, thereby achieving a series of processing on hardware.

The present application contains subject matter related to that disclosed in Japanese Priority Patent Application JP 2008-195227 filed in the Japan Patent Office on Jul. 29, 2008, the entire content of which is hereby incorporated by reference.

What is claimed is:

1. An information processing apparatus comprising:
a memory to store reference parameter information made up of a plurality of pieces of parameter information and associated with each program;
an acquisition unit, implemented by circuitry, to acquire plurality of pieces of parameter information of current time and temperature or weather information;
a specifying unit, implemented by the circuitry, to specify a program associated with a reference parameter similar to the plurality of pieces of parameter information of the current time and temperature or weather information;
a communication unit, implemented by the circuitry, to send, to an information server, the reference parameter information stored at the memory along with a request for additional reference parameter information, in response to a determination that the reference parameter information stored at the memory is insufficient information, and to transmit the plurality of pieces of parameter information of the current time and temperature or weather information to the information server storing reference parameter information in association with each program;
a display control unit, implemented by the circuitry, to create, in response to the communication unit receiving, from the information server, a list of a plurality of icons of programs for display on a startup menu screen based on a similarity to the parameter information of the current time and temperature or weather information transmitted by the communication unit to the information server, the startup menu screen displaying icons of the programs in the list and an additional icon that is set to always be included in the startup menu screen, a first set of icons of the plurality of icons on the startup menu screen being gradually changed to a second set of icons of the plurality of icons while the information processing apparatus travels from a first location to a second location and while the information processing apparatus is in between the first location and the second location, and at least one icon of the plurality of icons present in both the first and second sets changing display location on the startup menu screen as the first set of icons is gradually changed to the second set of icons; and
an information management unit, implemented by the circuitry, to calculate center parameter information of reference parameter information of a plurality of programs, wherein
the specifying unit specifies a program by using the center parameter information as the plurality of pieces of parameter information of the current time and temperature or weather information.

2. The information processing apparatus according to claim 1, wherein the information management unit, updates the reference parameter information stored in the memory by using the plurality of pieces of parameter information at startup of each program.

3. The information processing apparatus according to claim 2, wherein
the plurality of pieces of parameter information include positional information.

4. The information processing apparatus according to claim 2, wherein
the memory stores reference parameter information received from the information server by the communication unit.

5. The information processing apparatus according to claim 1, wherein
the information server stores reference parameter information received from a plurality of information processing apparatuses with respect to each information processing apparatus, and
upon receiving reference parameter information from the communication unit, the information server transmits a reference parameter of an information processing apparatus similar to the reference parameter information in return.

6. The information processing apparatus according to claim 5, wherein
the specifying unit specifies a program by using a reference parameter stored in the memory and a reference parameter transmitted from the information server.

7. The information processing apparatus according to claim 1, wherein
the specifying unit changes parameter information to be used for specifying a program according to conditions of user operation.

8. The information processing apparatus according to claim 1, wherein
the specifying unit specifies a program by using other center parameter information as the plurality of pieces of parameter information of the current time and temperature or weather information according to user operation.

9. The information processing apparatus according to claim 2, wherein
the plurality of pieces of parameter information include connection destination identification information indicating an external device connected to the information processing apparatus.

10. The information processing apparatus according to claim 2, wherein
the information processing apparatus is configured to transmit and receive the reference parameter information stored in the memory to and from another information processing apparatus.

11. The information processing apparatus according to claim 1, wherein
the first location is a work location and the second location is a home location, and
the first set of icons of the plurality of icons on the startup menu screen being gradually changed to the second set of icons of the plurality of icons while the information processing apparatus is in between the work location and the home location, and not at the work location and the home location.

12. An information processing method for an information processing device, the information processing method comprising the steps of:

storing reference parameter information made up of a plurality of pieces of parameter information and associated with each program;

acquiring plurality of pieces of parameter information of current time and temperature or weather information;

specifying a program associated with a reference parameter similar to the plurality of pieces of parameter information of the current time and temperature or weather information;

sending, to an information server, the reference parameter information stored at the storing step along with a request for additional reference parameter information, in response to a determination that the reference parameter information stored at the storing step is insufficient information;

transmitting the plurality of pieces of parameter information of the current time and temperature or weather information to the information server storing reference parameter information in association with each program;

creating, in response to receiving, from the information server, a list of a plurality of icons of programs for display on a startup menu screen based on a similarity to the parameter information of the current time and temperature or weather information transmitted to the information server, the startup menu screen displaying icons of the programs in the list and an additional icon that is set to always be included in the startup menu screen;

gradually changing a first set of icons of the plurality of icons on the startup menu screen to a second set of icons of the plurality of icons while the information processing device travels from a first location to a second location and while the information processing device is in between the first location and the second location;

changing display location on the startup menu screen of at least one icon of the plurality of icons present in both the first and second sets as the first set of icons is gradually changed to the second set of icons; and calculating center parameter information of reference parameter information of a plurality of programs, wherein the specifying specifies a program by using the center parameter information as the plurality of pieces of parameter information of the current time and temperature or weather information.

13. An information processing system comprising:

an information server storing reference parameter information made up of a plurality of pieces of parameter information and associated with each program, and an information processing apparatus including circuitry configured to acquire plurality of pieces of parameter information of current time and temperature or weather information, specify a program associated with a reference parameter similar to the plurality of pieces of parameter information of the current time and temperature or weather information, send, to the information server, reference parameter information stored at the information processing apparatus along with a request for additional reference parameter information, in response to a determination that the reference parameter information stored at the information processing apparatus is insufficient information, and to transmit the plurality of pieces of parameter information of the current time and temperature or weather information to the information server storing reference parameter information in association with each program, create, in response to receiving, from the information server, a list of a plurality of icons of programs for display on a startup menu screen based on a similarity to the parameter information of the current time and temperature or weather information transmitted to the information server, the startup menu screen displaying icons of the programs in the list and an additional icon that is set to always be included in the startup menu screen, a first set of icons of the plurality of icons on the startup menu screen being gradually changed to a second set of icons of the plurality of icons while the information processing apparatus travels from a first location to a second location and while the information processing apparatus is in between the first location and the second location, and at least one icon of the plurality of icons present in both the first and second sets changing display location on the startup menu screen as the first set of icons is gradually changed to the second set of icons, and calculate center parameter information of reference parameter information of a plurality of programs, wherein the circuitry is further configured to specify a program by using the center parameter information as the plurality of pieces of parameter information of the current time and temperature or weather information.

14. A non-transitory computer readable storage medium encoded with instructions, which when executed by a computer causes the computer to function as an information processing device, the instructions causing the computer to implement a method comprising:

storing reference parameter information made up of a plurality of pieces of parameter information and associated with each program;

acquiring plurality of pieces of parameter information of current time and temperature or weather information;

specifying a program associated with a reference parameter similar to the plurality of pieces of parameter information of the current time and temperature or weather information;

sending, to an information server, the reference parameter information stored at the storing step along with a request for additional reference parameter information, in response to a determination that the reference parameter information stored at the storing step is insufficient information;

transmitting the plurality of pieces of parameter information of the current time and temperature or weather information to the information server storing reference parameter information in association with each program;

creating, in response to receiving, from the information server, a list of a plurality of icons of programs for display on a startup menu screen based on a similarity to the parameter information of the current time and temperature or weather information transmitted to the information server, the startup menu screen displaying icons of the programs in the list and an additional icon that is set to always be included in the startup menu screen;

gradually changing a first set of icons of the plurality of icons on the startup menu screen to a second set of icons of the plurality of icons while the information processing device travels from a first location to a second location and while the information processing device is in between the first location and the second location;

changing display location on the startup menu screen of at least one icon of the plurality of icons present in both the first and second sets as the first set of icons is gradually changed to the second set of icons; and calculating center parameter information of reference parameter information of a plurality of programs, wherein the specifying specifies a program by using the center parameter information as the plurality of pieces of parameter information of the current time and temperature or weather information.

* * * * *